(12) United States Patent
Yang et al.

(10) Patent No.: US 9,473,248 B2
(45) Date of Patent: Oct. 18, 2016

(54) METHOD AND DEVICE FOR VISIBLE LIGHT COMMUNICATION

(71) Applicant: KONINKLIJKE PHILIPS N.V., Eindhoven (NL)

(72) Inventors: Hongming Yang, Eindhoven (NL); Ashish Vijay Pandharipande, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 25 days.

(21) Appl. No.: 14/391,821

(22) PCT Filed: Mar. 28, 2013

(86) PCT No.: PCT/IB2013/052484
§ 371 (c)(1),
(2) Date: Oct. 10, 2014

(87) PCT Pub. No.: WO2013/153476
PCT Pub. Date: Oct. 17, 2013

(65) Prior Publication Data
US 2015/0078743 A1    Mar. 19, 2015

Related U.S. Application Data

(60) Provisional application No. 61/623,603, filed on Apr. 13, 2012.

(51) Int. Cl.
*H04B 10/08* (2006.01)
*H04B 10/564* (2013.01)
(Continued)

(52) U.S. Cl.
CPC ...... *H04B 10/564* (2013.01); *H04B 10/07955* (2013.01); *H04B 10/116* (2013.01)

(58) Field of Classification Search
CPC ....................... H04B 10/564; H04B 10/07955
See application file for complete search history.

(56) References Cited

U.S. PATENT DOCUMENTS

| 2003/0030386 A1 | 2/2003 | Leeb et al. | |
| 2011/0043116 A1* | 2/2011 | Schenk | H05B 37/0272 315/152 |

(Continued)

FOREIGN PATENT DOCUMENTS

| WO | 2006079199 A1 | 8/2006 |
| WO | 2009010909 A1 | 1/2009 |

(Continued)

OTHER PUBLICATIONS

Deron K. Jackson et al: "FIAT LUX: A Fluroescent Lamp Digital Transceiver", IEEE Transactions on Industry Applications, IEEE Service Center, Piscataway, NY, vol. 34, No. 3, Jun. 1, 1998, XP011022380, Whole Document.

*Primary Examiner* — Dzung Tran
(74) *Attorney, Agent, or Firm* — Meenakshy Chakravorty (57) ABSTRACT

A method and device for visible light communication is disclosed. The method comprises selecting a first sequence and a second sequence of light intensity frequencies to represent a first symbol and a second symbol, respectively, for embedding data. The method comprises further transmitting a light signal. The light signal comprises time periods in which a light intensity of the light signal is sequentially controlled according to the selected sequence of light intensity frequencies. Thereby, a frequency hopping light signal is generated, in which data may be embedded. The light signal may be generated and transmitted by the device comprising a light emitter.

12 Claims, 7 Drawing Sheets

(51) Int. Cl.
   *H04B 10/116*   (2013.01)
   *H04B 10/079*   (2013.01)

(56) References Cited

U.S. PATENT DOCUMENTS

2011/0202151 A1*  8/2011  Covaro .............. H05B 37/0272
                                                              700/90
2012/0128365 A1*  5/2012  Paek .................... H04B 10/116
                                                              398/118
2012/0153838 A1*  6/2012  Schenk .............. H05B 37/0272
                                                              315/151

FOREIGN PATENT DOCUMENTS

| WO | 2011024126 A2 | 3/2011 |
| WO | 2012052935 A1 | 4/2012 |
| WO | 2013001408 A1 | 1/2013 |

* cited by examiner

METHOD AND DEVICE FOR VISIBLE LIGHT COMMUNICATION

CROSS-REFERENCE TO PRIOR APPLICATIONS

This application is the U.S. National Phase application under 35 U.S.C. §371 of International Application No. PCT/IB2013/052484, filed on Mar. 28, 2013, which claims the benefit of U.S. Provisional Patent Application No. 61/623,603, filed on Apr. 13, 2012. These applications are hereby incorporated by reference herein.

FIELD OF THE INVENTION

The present invention relates to the field of visible light communication, and is directed towards an improved method and device for transmitting data by visible light communication.

BACKGROUND OF THE INVENTION

Visible light communications (VLC) is a growing wireless communication technique, utilizing a light source, such as a LED, for communicating various types of data. Many applications exist, such as intelligent lighting control, high speed data streaming, etc. Moreover, an IEEE 802.15.7 standard for VLC has been released, and future enhancements will be likely forthcoming.

As for other wireless communication techniques, the communication channel for VLC is exposed to various interferences. There are different techniques of how to handle such interferences. As an example, WO 2009010909 is directed towards a method for employing visible light from lamps in order to transmit data to a receiver. The document discloses that bi-phase modulation of the signal may be utilized in order to prevent interference from low-frequency components in the environmental illumination. Although this and other documents provide working solutions for problems addressed in those documents, there is still a need for improvement of known VLC techniques.

SUMMARY OF THE INVENTION

It is an object of the present invention to overcome this problem, and to provide a VLC method which is improved relative to known VLC techniques.

According to a first aspect of the invention, this and other objects are achieved by a method for visible light communication, the method comprising: selecting a first sequence of light intensity frequencies to represent a first symbol for embedding data, and selecting a second sequence, different from the first, of light intensity frequencies, to represent a second symbol for embedding data; and transmitting a light signal comprising a first time period in which a light intensity of the light signal is sequentially controlled according to the first sequence of frequencies, and comprising a second time period in which the light intensity of the light signal is sequentially controlled according to the second sequence of frequencies, thereby generating a frequency hopping light signal.

Thus, the light signal is composed by a plurality of subsequent time periods. During one such time period, the light signal is sequentially controlled such that it varies between different intensities with a frequency according to one of the selected sequences of light intensity frequencies. By sequentially is meant that the intensity frequency in a time period varies according to the order of the frequencies in the corresponding selected sequence.

The light signal comprises at least two time periods in which the light signal is sequentially controlled according to different sequences of light intensity frequencies.

The frequency hopping signal represents a sequence of symbols forming data. The first symbol may correspond to a bit 0 and the second symbol may correspond to a bit 1, wherein the data for transmission is composed by bits of 1 and 0.

The frequency hopping scheme could be predetermined, i.e. the transmitter and receiver could be configured such that the first sequence and second sequence of light intensity frequencies are determined once and thereafter remains fixed. Alternatively, the frequency hopping scheme could be flexible, i.e. the first and/or second sequences of light intensity frequencies are re-selected over time. Information about the frequency hopping scheme for a particular data packet could be transmitted to the receiver in a header to the data packet. The part of the light signal comprising the header could be modulated according to a known modulation of VLC signals.

Thus, the invention according to the first aspect provides an intensity frequency modulation for light signals for transmitting data by VLC. The method provides, relative to known techniques, an improved robustness against surrounding interferences. The interference intensity frequencies may comprise fundamental intensity frequencies, and/or comprise multiple harmonics of intensity frequencies. Interferences are periodical, i.e. consist of a fixed intensity frequency, or flexible, i.e. consist of an intensity frequency which varies over time.

One of the main obstacles for VLC is the existence of interferences, attributed to two reasons. Firstly, there are many light sources which can potentially be interference sources, such as lamps, computer and laptop screens, or TVs. The strength of these interferences can be much higher, such as an order of magnitude higher, than the light signal utilized in the VLC. Secondly, there is no regulation in the visible light spectrum, in comparison to other communication media such as radio communications. In other words, VLCs can employ any part of the visible light spectrum for the purpose of communications. The common approach of letting different communication devices employ non-overlapping signal bandwidths, or share the common bandwidth via multiple access schemes, is thus not applicable since there are currently no regulations foreseen for the VLC frequency spectrum.

Since the light intensity frequency of the light signal according to the present approach varies sequentially according to a sequence of different frequencies, the light signal becomes distinct relative to surrounding interferences. Thus, data can be transmitted even with interferences present. By utilizing a sequence of different intensity frequencies, the data may be transmitted even though some of the intensity frequencies coincide with intensity frequencies of surrounding interference sources, since at least a part of the light signal transmitted during a time period corresponding to a specific symbol is likely to be transmitted to the receiver arranged to received the light signal. By the received parts of the light signal transmitted during the time period, the corresponding symbol could be extracted when the received parts uniquely identifies the symbol.

Moreover, the VLC according to the present approach may utilize frequencies in the same bandwidth as for the intensity frequencies of interference sources. Thereby, the range of feasible intensity frequencies is widened relative to known techniques in which frequencies in the same bandwidth are avoided in order to avoid the corresponding interferences.

The second sequence of frequencies may comprise the same frequencies as the first sequence of frequencies, but arranged in a different order than the first sequence of frequencies. An advantage with this feature is that the number of light intensity frequencies that have to be detected by the receiver, arranged to receive the light signal, is limited. Thus, this feature improves the easiness of detection of the light signal.

In particular, the second sequence of frequencies may be arranged in a reverse order relative to the first sequence of frequencies. An advantage with this feature is that the first sequence and second sequence of light intensity frequencies are distinct from each other, which makes it easier for the receiver to distinguish them. Thus, this feature further improves the easy detection of the light signal.

The light intensity of the light signal may be controlled by shifting the light intensity between a first intensity and a second intensity. In particular, the frequency period of the time periods may have a duty cycle of 50%. By duty cycle is meant the ratio of the time the light signal having a higher intensity to the total time of the light signal. In some transmitter configurations, this is a convenient approach.

The lower of the intensities may be zero. Thus, the light signal is composed of on-off sequences with varying on-off intensity frequencies.

The light signal may be equal to a pulse-width modulation signal which is utilized for controlling power to a transmitter arranged for transmitting the light signal.

The method may further comprise: selecting a reference frequency; and generating a set of candidate light intensity frequencies by dividing the reference frequency by a plurality of mutually different divisors, wherein each quotient defines a candidate light intensity frequency. The first and second sequences of light intensity frequencies are selected from the set of candidate light intensity frequencies.

An advantage with this approach is that it provides an effective generation of the light intensity frequencies. Especially, the approach is more effective than using a frequency synthesizer.

The divisors may be selected to be prime numbers. Thus, the light intensity frequencies utilized in the light signal are not multiples of each other. It is thereby avoided that a first selected light intensity frequency is detected as a second selected light intensity frequency being a multiple of the first selected light intensity frequency. Further, it is avoided that more than one selected frequency is interfered by an interference frequency or a multiple harmonic thereof.

The reference frequency may be a clock frequency for a clock in a transmitter arranged to transmit the light signal.

The method may further comprise: measuring a frequency spectrum comprising light intensity frequencies in surrounding light; and generating a set of candidate light intensity frequencies by selecting light intensity frequencies which are unequal to frequencies, or unequal to multiples of frequencies, of the frequency spectrum, wherein each selected frequency defines a candidate light intensity frequency. The first and second sequences of light intensity frequencies are selected from the set of candidate light intensity frequencies.

By measuring surrounding light intensity frequencies, the light intensity frequencies for the light signal can be selected such that the signal is not exposed to interference from the surrounding light.

The method may further comprise: selecting a reference frequency; generating a first set of candidate light intensity frequencies by dividing the reference frequency by a plurality of mutually different divisors, wherein each quotient defines a candidate light intensity frequency in the first set of candidate light intensity frequencies; measuring a frequency spectrum comprising light intensity frequencies in surrounding light; generating a second set of candidate light intensity frequencies by selecting light intensity frequencies which are unequal to frequencies, or unequal to multiples of frequencies, of the frequency spectrum, wherein each selected frequency defines a candidate light intensity frequency in the second set of candidate light intensity frequencies; and generating a set of candidate light intensity frequencies by selecting the light intensity frequencies which form the intersection between the first set of candidate light intensity frequencies and the second set of candidate light intensity frequencies. The first and second sequences of light intensity frequencies are selected from the set of candidate light intensity frequencies.

This approach combines the advantages mentioned above: that an effective generation of the light intensity frequencies is provided, and that the light intensity frequencies for the light signal can be selected such that the signal is not exposed to interference from the surrounding light. The generating of the first set of candidate light intensity frequencies and the second set of candidate light intensity frequencies may alternatively be performed in the reverse order or in parallel to each other.

The light intensity frequencies in the first sequence and/or the second sequence of light intensity frequencies may be mutually prime. By this approach, the light intensity frequencies utilized in the light signal are not multiples of each other. It is thereby avoided that a first selected light intensity frequency is detected as a second selected light intensity frequency being a multiple of the first selected light intensity frequency. Further, it is avoided that more than one selected frequency is interfered by an interference frequency or a multiple harmonic thereof.

The light intensity frequencies in the first and second sequences may be in the order of 100 Hz up to a few MHz.

In some embodiments, it is advantageous if the light intensity frequencies lie within the range of 100 Hz to 50 000 Hz. Most of the known VLC approaches focus on the frequency spectrum above 100 kHz for the VLC signal, such as the IEEE 802.15.7 standard, in order to not be interfered by interference frequency intensities which normally lie below tens of kHz. Frequencies in the order of above 100 kHz require specifically designed light sources and driver components, which are high-cost components. By the present approach for VLC, it is possible to also use frequencies in the same range as the interference frequencies.

This feature provides a more low-cost implementation of the VLC. It may be noted that in order to enable a light emitter to produce a light signal at above 100 kHz or even a few MHz, the driver of the light emitter needs to be specially designed. Further, more powerful and expensive analog and digital components usually need to be employed. Moreover, additional careful means have to be taken to avoid electro-magnetic compliance (EMC) issues. Because of these reasons, the cost of the light emitter will be significantly increased. However, if the light emitter is driven at a lower frequency, as possible according to the present approach, specially designed light emitters and expensive components are normally not needed. For instance, the capability of varying the light output at a lower frequency may be already available, e.g. by a present pulse-width modulation dimming signal, which could be utilized. The requirement on EMC issues is also less strict at lower frequencies, thus reducing the implementation costs further.

According to a second aspect of the invention, the above mentioned and other objects are achieved by a light transmitter device for visible light communication, the device comprising: a frequency sequence selector for selecting a first sequence of light intensity frequencies to represent a first symbol for embedding data, and for selecting a second sequence, different from the first, of light intensity frequencies, to represent a second symbol for embedding data; and a light emitter arranged for emitting a light signal comprising a first time period in which a light intensity of the light signal is sequentially controlled according to the first sequence of frequencies, and comprising a second time period in which the light intensity of the light signal is sequentially controlled according to the second sequence of frequencies, thereby generating a frequency hopping light signal.

The light emitter may be chosen from the group of: light emitting diodes (LED), incandescent lamps, fluorescent lamps, laser light sources, or a combination thereof. Other suitable light emitters or combinations thereof are of course also feasible.

The above disclosed features of the first aspect is also applicable to this second aspect.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

The figures are adapted for illustrative purposes and, thus, are provided to illustrate the general concept of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
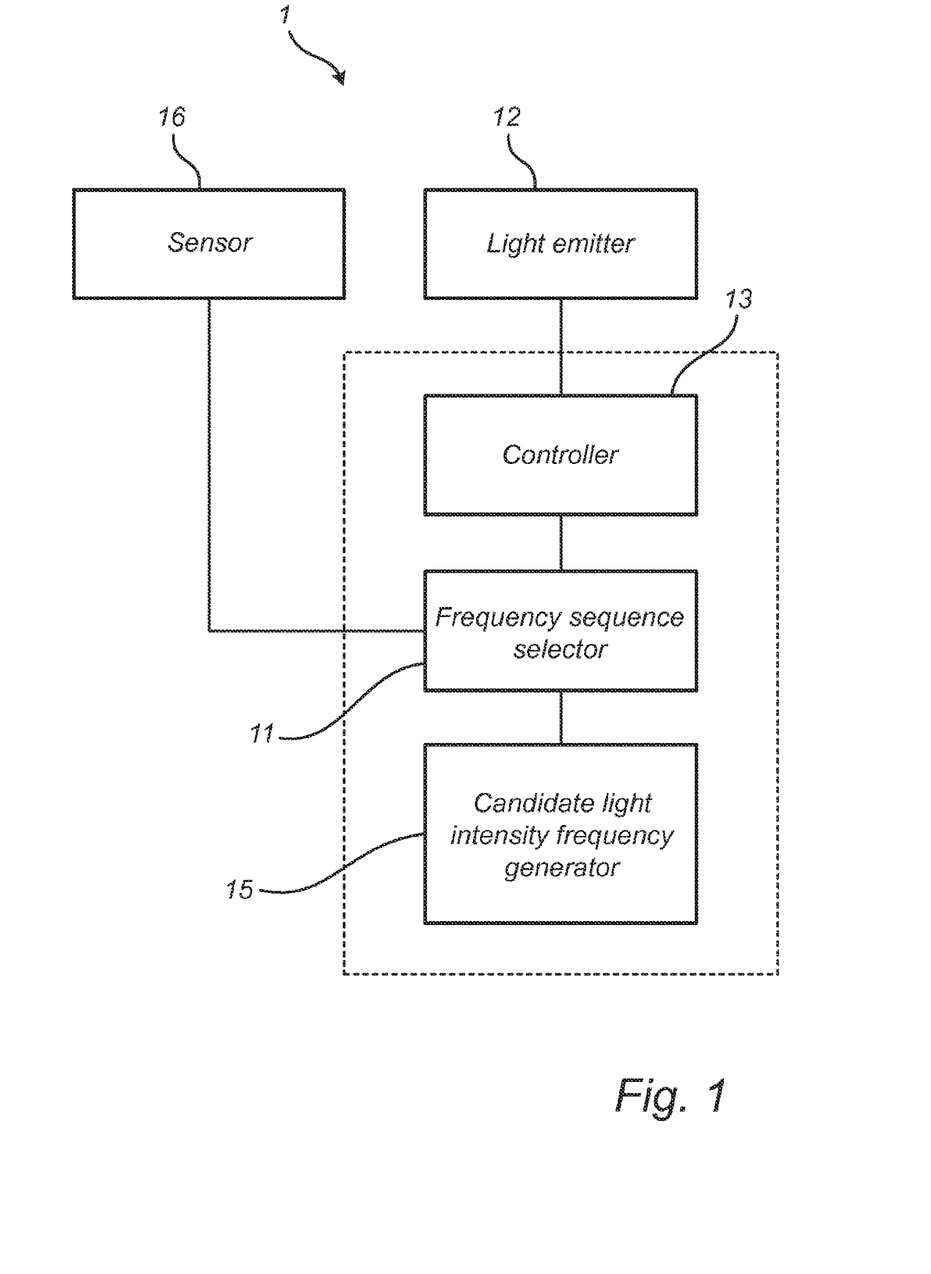
FIG. 1 illustrates a light transmitter device.

A light transmitter device 1 is illustrated in FIG. 1. The light transmitter device 1 comprises a frequency sequence selector 11, a light emitter 12, a controller 13, a candidate light intensity frequency generator 15, and an optional sensor 16.

The light transmitter device 1 is arranged for visible light communication, i.e. transmitting data by a light signal. The frequency sequence selector 11 is arranged for selecting a sequence of frequencies. By sequence of frequencies is meant a plurality of frequencies which are arranged in a specific order. The frequency sequence selector 11 could be a hardware, such as a processor, or a software implemented method. The selected sequence represents a symbol for embedding data.

The light emitter 12 is arranged for emitting light forming a light signal for embedding data. The light emitter 12 could for example be a LED, an incandescent lamp, a fluorescent lamp, a laser light source, or any other suitable light source. A combination of light sources is also feasible.

The controller 13 is arranged to sequentially control the light intensity of the light signal according to a selected sequence of frequencies and during a time period of the light signal, thereby generating a frequency hopping light signal. The controller 13 could be a hardware, such as a processor, or a software implemented method.

The candidate light intensity frequency generator 15 is arranged to generate candidate light intensity frequencies which the sequence of frequencies may be selected from. The candidate light intensity frequency generator 15 could be a hardware, such as a processor, or a software implemented method. The function of the candidate light intensity frequency generator 15 will be disclosed in detail below.

The sensor 16 is arranged to measure a frequency spectrum which comprises the light intensity frequencies which are present in the area surrounding the light transmitter device 1. The sensor 16 could be integrated in the light transmitter device 1, or could alternatively be arranged as a separate hardware in connection to the light transmitter device 1. The sensor 16 could for example be a photo sensor, such as a photo diode, together with associated sensor signal processing circuits.

The light transmitter device may further comprise a memory (not illustrated) for storing various data, such as generated candidate light intensity frequencies, selected sequences, previously transmitter light signals, predetermined frequency hopping schemes, etc.

The frequency sequence selector 11, controller 13, and candidate light intensity frequency generator 15 could be integrated in a single component, as indicated by the figure. Various configurations of the components are feasible, as understood by the skilled person.

Figure 2:
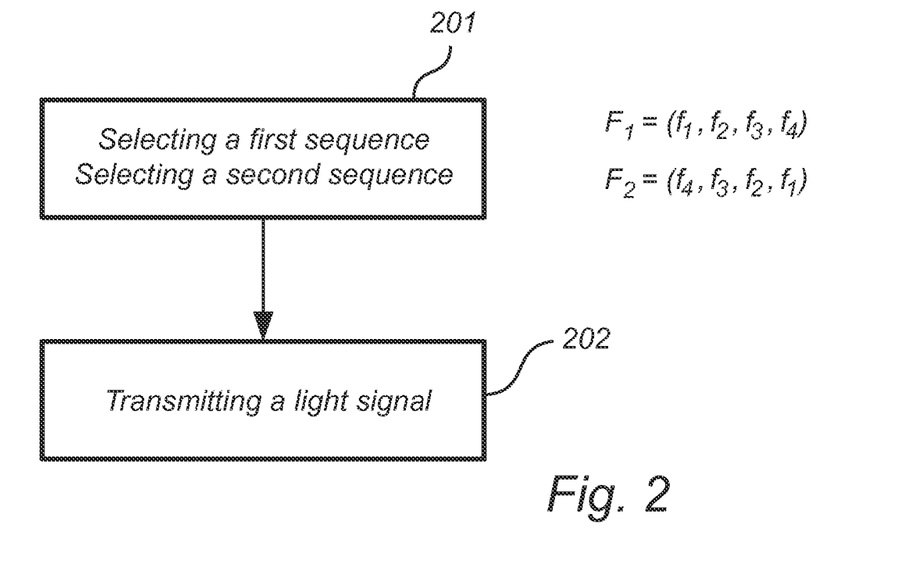
FIG. 2 illustrates a method for visible light communication.
Figure 3:
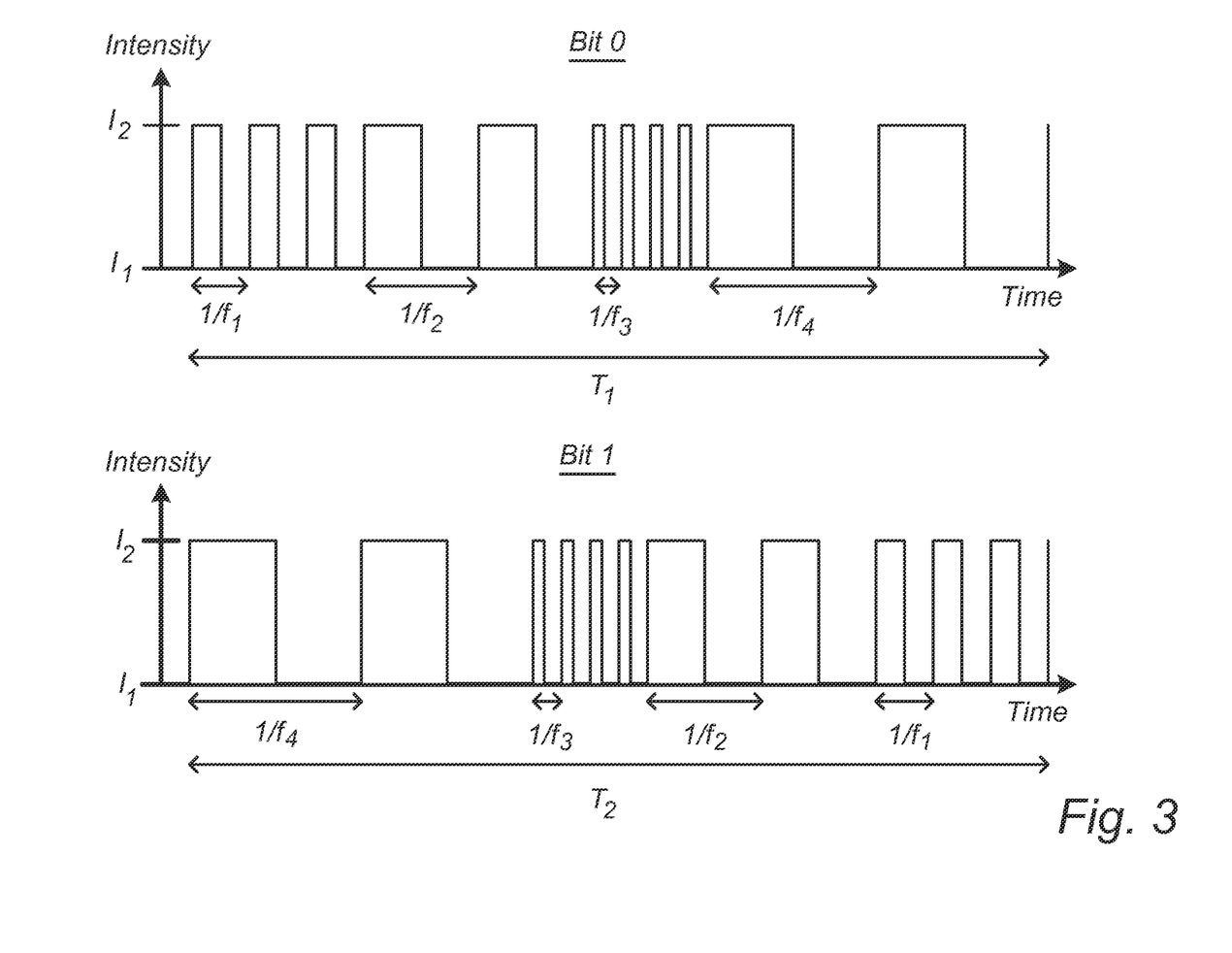
FIG. 3 illustrates time periods of a light signal.

The method by which the light signal is achieved will now be described with reference to FIGS. 2-4.

The method comprises selecting 201 a first sequence $F_1$ of light intensity frequencies and a second sequence $F_2$ of light intensity frequencies. The first sequence $F_1$ consists of intensity frequencies $f_1$, $f_2$, $f_3$, and $f_4$ arranged in that order. The second sequence $F_2$ may consist of intensity frequencies $f_4$, $f_3$, $f_2$, and $f_1$ arranged in that order. The first sequence $F_1$ represents a first symbol "Bit 0" for embedding data, and the second sequence $F_2$ represents a second symbol "Bit 1" for embedding data. The first sequence $F_1$ and second sequence $F_2$ are different, but may, as in this embodiment, be composed by the same frequencies but arranged in different orders.

The frequencies in the sequences may be selected such that they are mutually prime to each other, preferably both within a single sequence and for all frequencies in all sequences. Thereby, the risk of suffering from multiple harmonics of a single interference frequency is at least reduced. For instance, if $f_1$ is selected to be a frequency in the first sequence $F_1$, then a multiple of the intensity frequency $f_1$, such as $2 \times f_1$, $3 \times f_1$, or $4 \times f_1$, would not be selected as an intensity frequency in either the first sequence $F_1$ or the second sequence $F_2$.

The method further comprises transmitting 202 a light signal. The light signal is composed by time periods in which the light intensity is controlled. The time periods are illustrated in FIG. 3. A first time period $T_1$ represents the first symbol "Bit 0" and a second time period $T_2$ represents the second symbol "Bit 1".

The intensity of light in the time period $T_1$ representing "Bit 0" is controlled by shifting the intensity between a first intensity $I_1$ and a second, different from the first, intensity $I_2$. The intensity control is performed sequentially according to the first sequence $F_1$ of light intensity frequencies, as indicated by the period lengths $1/f_i$ where i=1, 2, 3, 4. In this embodiment, the light intensity is shifted between two intensity levels. In other embodiments, the light intensity may be shifted, or controlled, between more than two intensities, however still in a periodical manner with a specific frequency.

In this embodiment, the intensity $I_1$ is zero. Thus, the light signal is shifted between an on state and an off state. However, it is also feasible to shift the light signal between two non-zero intensities.

Alternatively, the light signal could be controlled by varying the intensity according to e.g. a sinus function, the light signal could be controlled to vary between several intensities, or a combination of these variations could be utilized.

By sequentially controlling according to a sequence of light intensity frequencies is meant to control the intensity according to the first intensity frequency in the sequence for a first part of the time period, according to the second frequency in the sequence for a subsequent second period of the time period, etc, such that the light intensity frequencies of the light signal during the time period varies according to the light intensity frequencies in the sequence, and varies according to the order of the light intensity frequencies in the sequence.

The light intensity of the light signal during the second time period $T_2$ is controlled in the same manner as for the first time period $T_1$. The intensities between which the light signal intensity is shifted in the second time period $T_2$ does not need to be the same as for the first time period $T_1$. The second time period $T_2$ could also be of different length than the first time period $T_1$.

The number of periods for each time period part, in which the light intensity is controlled according to an intensity frequency of one of the sequences of light intensity frequencies, could differ between different parts, different time periods and different embodiments. The number of periods could e.g. be predetermined according to a standard, or be flexible such that is may be altered depending on embodiment.

In this embodiment, the frequencies of the second sequence $F_2$ are the same frequencies as in the first sequence $F_1$. This approach makes it easier for a receiver, arranged to receive the light signal, to detect the frequencies in the light signal, since the number of frequencies is limited. It could be predetermined and preconfigured in the receiver that the second sequence $F_2$ should be composed on the basis of the first sequence $F_1$, e.g. by the same frequencies but in the reverse order or alternatively in another permutation. Thus, only information regarding the first sequence of frequencies needs to be known to the receiver, thereby reducing the amount of data that need to be transmitted to or configured in the receiver.

Further, the frequencies of the second sequence $F_2$ may be arranged in the reverse order relative to the first sequence $F_1$. This arrangement makes the first sequence $F_1$ and second sequence $F_2$ distinct from each other. It is thereby easier for the receiver to distinguish them from each other.

Figure 4:
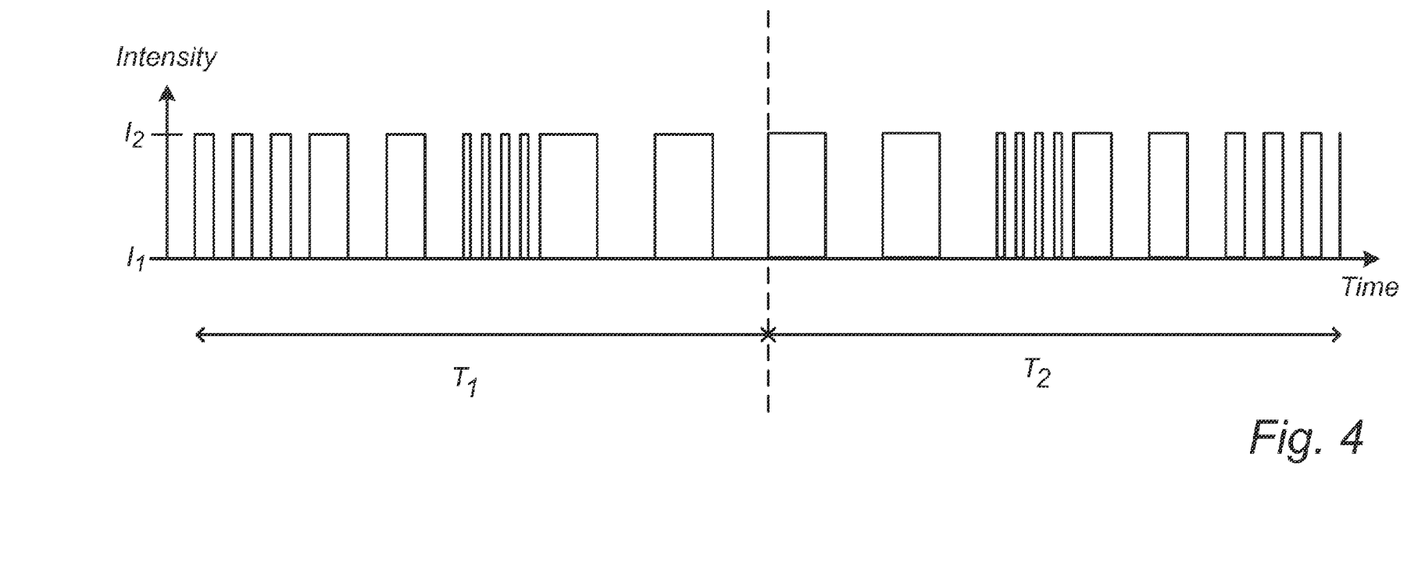
FIG. 4 illustrates the light signal comprising the time periods as illustrated in FIG. 3.

The light signal, which comprises time periods $T_1$ and $T_2$ representing the first symbol ("Bit 0") and the second symbol ("Bit 1"), respectively, are illustrated in FIG. 4. This is an illustrative figure for understanding of the method. In reality, the light signal comprises a combination of a much greater amount of the consecutive symbols for embedding data. Data, which are represented by a combination of symbols in a sequence, may thus be transmitted.

Figure 5:
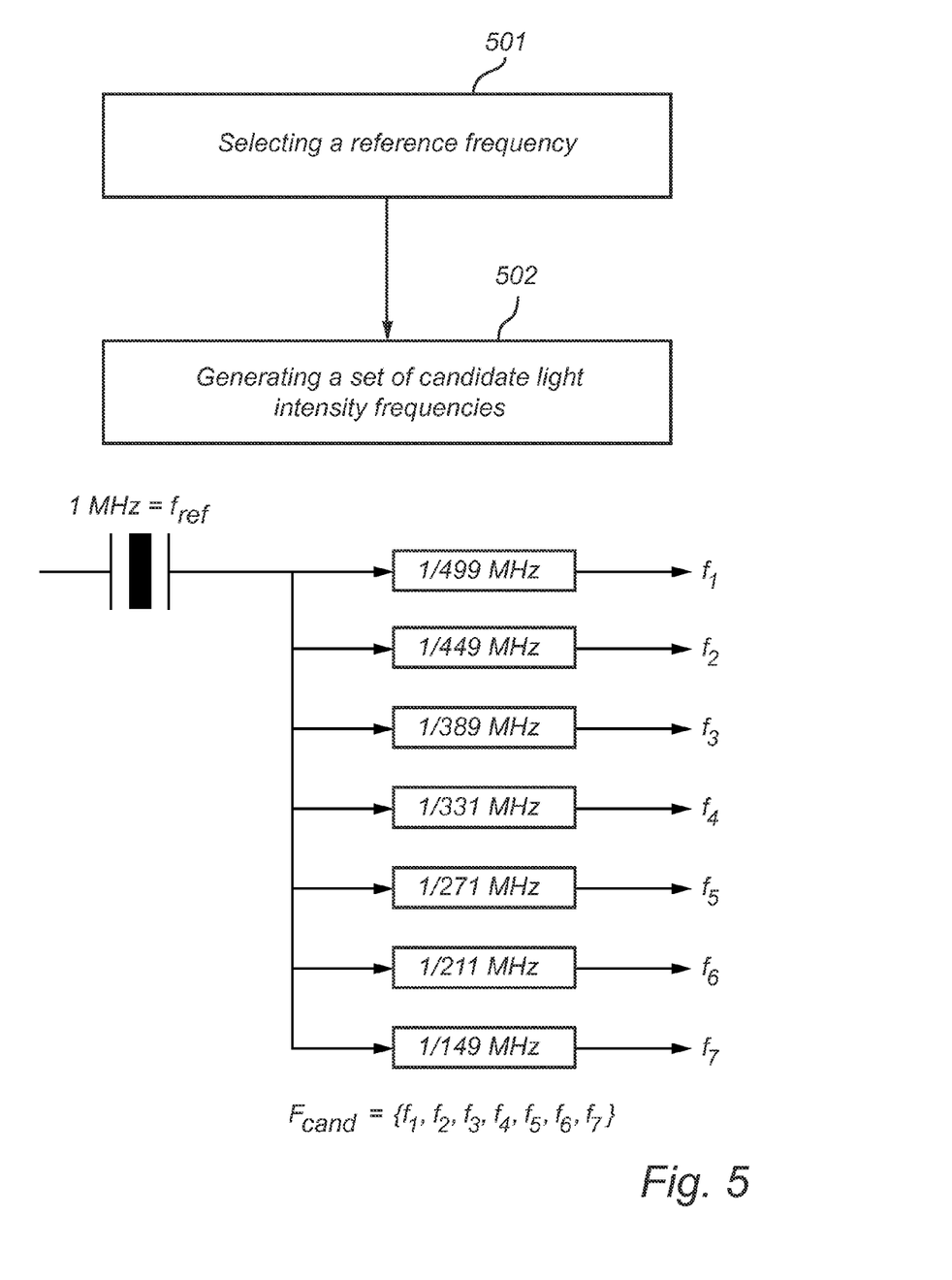
FIGS. 5-7 illustrate methods for generating a set of candidate light intensity frequencies, according to different embodiments of the invention.

In one embodiment, the first sequence $F_1$ and second sequence $F_2$ of frequencies are selected as illustrated in FIG. 5. The method according to above then further comprises selecting 501 a reference frequency $f_{ref}$ and generating 502 a set of candidate light intensity frequencies $F_{cand}$.

The reference frequency $f_{ref}$ is in this embodiment selected to be a clock frequency of a clock (not illustrated) which is arranged in the light transmitter device 1. Clocks are according to common practice arranged in various components such as transmitters, transceivers, processors, etc. Such a clock often runs at a high frequency, such as in the order of MHz. In this embodiment, the reference frequency $f_{ref}$ is selected to 1 MHz.

The set of candidate light intensity frequencies $F_{cand}$ is generated by dividing the $f_{ref}$ by divisors. The divisors are integer values. Each formed quotient defines a candidate light intensity frequency. Together, the candidate light intensity frequencies form the set of candidate frequencies $F_{cand}$. From the set of light intensity candidate frequencies $F_{cand}$, the first sequence $F_1$ and second sequence $F_2$ of light intensity frequencies are selected. Hence, the generating 502 of the set of candidate light intensity frequencies $F_{cand}$ is performed before the selecting 201 of the first sequence $F_1$ and second sequence $F_2$ of light intensity frequencies.

The divisors may be prime numbers. Thereby, the divisors, and consequently the quotients, are mutually prime relative to each other. Thus, the light intensity frequencies in the first sequence $F_1$ and second sequence $F_2$ becomes mutually prime to each other, which, as mentioned above, simplifies for the transmitter to generate the candidate light intensity frequencies.

In the light transmitter device 1, illustrated by FIG. 1, the set of candidate light intensity frequencies $F_{cand}$ is generated by the candidate light intensity frequency generator 15.

In one embodiment, the light signal is equal to a present pulse-width modulation dimming signal, i.e. equal to a pulse-width modulation signal which is utilized for controlling power to a light transmitter device for transmitting the light signal. In this embodiment, the intensity frequency of the light signal is same as the PWM dimming frequency. Hence, the PWM dimming frequency is varying according to the frequency variation of the frequency hopping light signal. The duty cycle of the light signal train is prescribed by the PWM dimming level. In this way, the light signal is generated in compatibility with the PWM dimming.

The light intensity frequencies of the first sequence $F_1$ and the second sequence $F_2$ may be selected while taking into account interference frequencies which are present in the VLC channel. Thus, these interference frequencies can be avoided, thereby achieving an even more improved robustness of the VLC. Embodiments explaining this approach will be disclosed in the following.

Figure 6:
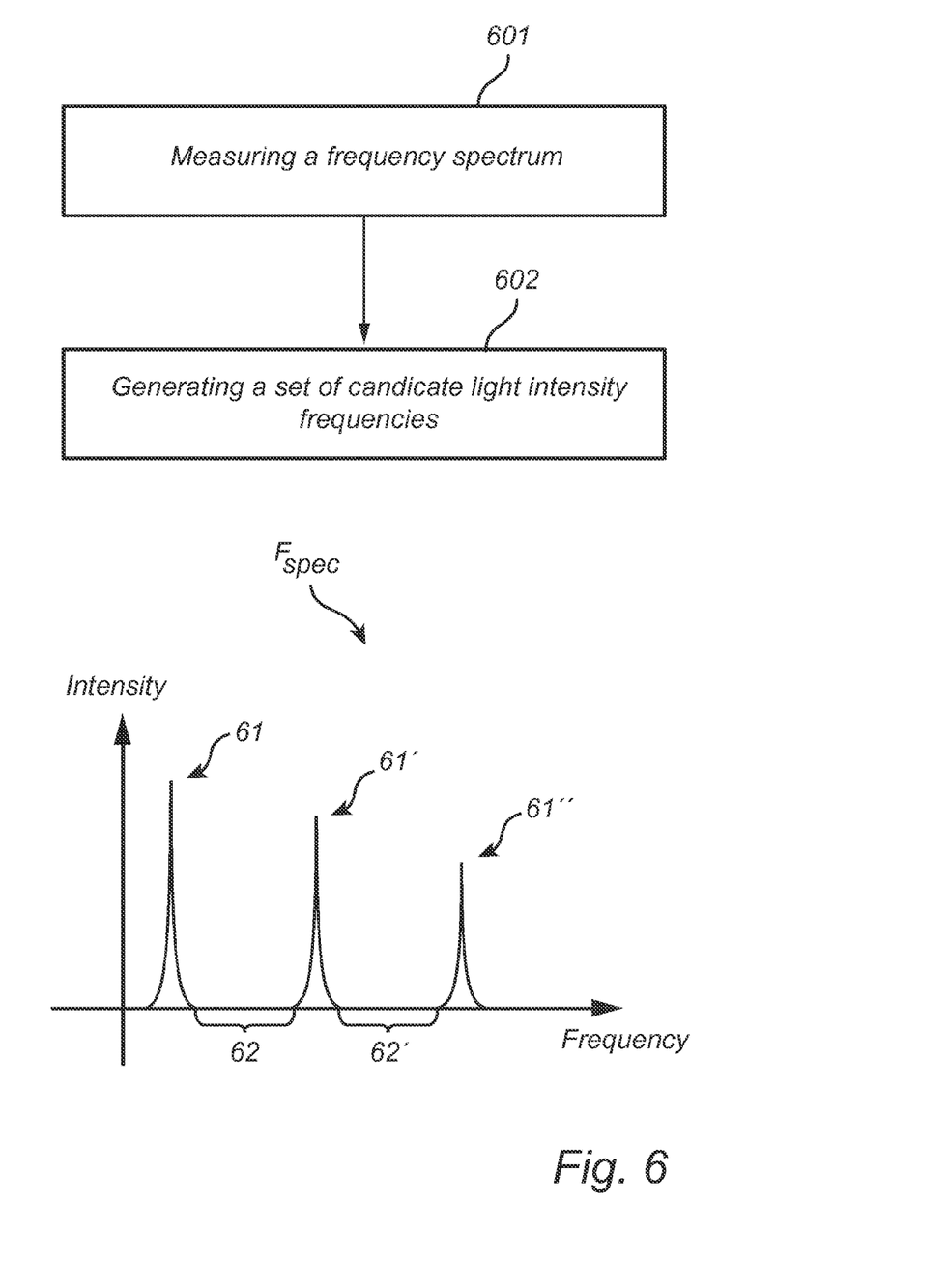

In one embodiment, the first sequence $F_1$ and second sequence $F_2$ of light intensity frequencies are selected as illustrated in FIG. 6. The method according to FIG. 2 comprises further measuring 601 a frequency spectrum $F_{spec}$ and generating 602 a set of candidate light intensity frequencies $F'_{cand}$.

The set of candidate light intensity frequencies $F'_{cand}$ comprises light intensity frequencies which are unequal to frequencies, or unequal to multiples of frequencies, of the frequency spectrum $F_{spec}$. The frequency spectrum $F_{spec}$ comprises the interference frequencies in the VLC channel. The interferences originate from surrounding interference sources, e.g. a laptop, a TV, or another VLC channel. In the frequency spectrum $F_{spec}$, intensity peaks 61, 61', 61" each correspond to a frequency which is present in the surrounding. Hence, the light intensity frequencies are selected from the frequency areas denoted by 62 and 62', where the intensity is low.

The frequency spectrum $F_{spec}$ could be obtained by sensing light from the surroundings, and applying Fast Fourier transform (FFT) to obtain the frequency spectrum. Other methods for obtaining the frequencies present in the surroundings are also feasible. The frequency spectrum $F_{spec}$ is not limited to a visual spectrum, as illustrated in FIG. 6, but could instead be represented by e.g. a table of data.

From the set of candidate light intensity frequencies $F'_{cand}$, the first sequence $F_1$ and second sequence $F_2$ of light intensity frequencies are selected. Hence, the intensity frequencies in the light signal do not coincide with any present interference frequencies.

In the light transmitter 1, illustrated by FIG. 1, the frequency spectrum $F_{spec}$ may be measured by the sensor 16, and the set of candidate light intensity frequencies $F'_{cand}$ is generated by the candidate light intensity frequency generator 15.

The measuring 601 of the frequency spectrum $F_{spec}$ and generating 602 of the set of candidate light intensity frequencies $F'_{cand}$ could be performed on a regular basis, or only once depending on the surrounding interference sources. A regular measuring 601 may be selected when the surrounding interference sources are expected to vary over time, whereas it could be sufficient to perform the measuring 601 once for a surrounding where the interference sources are expected to be stationary.

Figure 7:
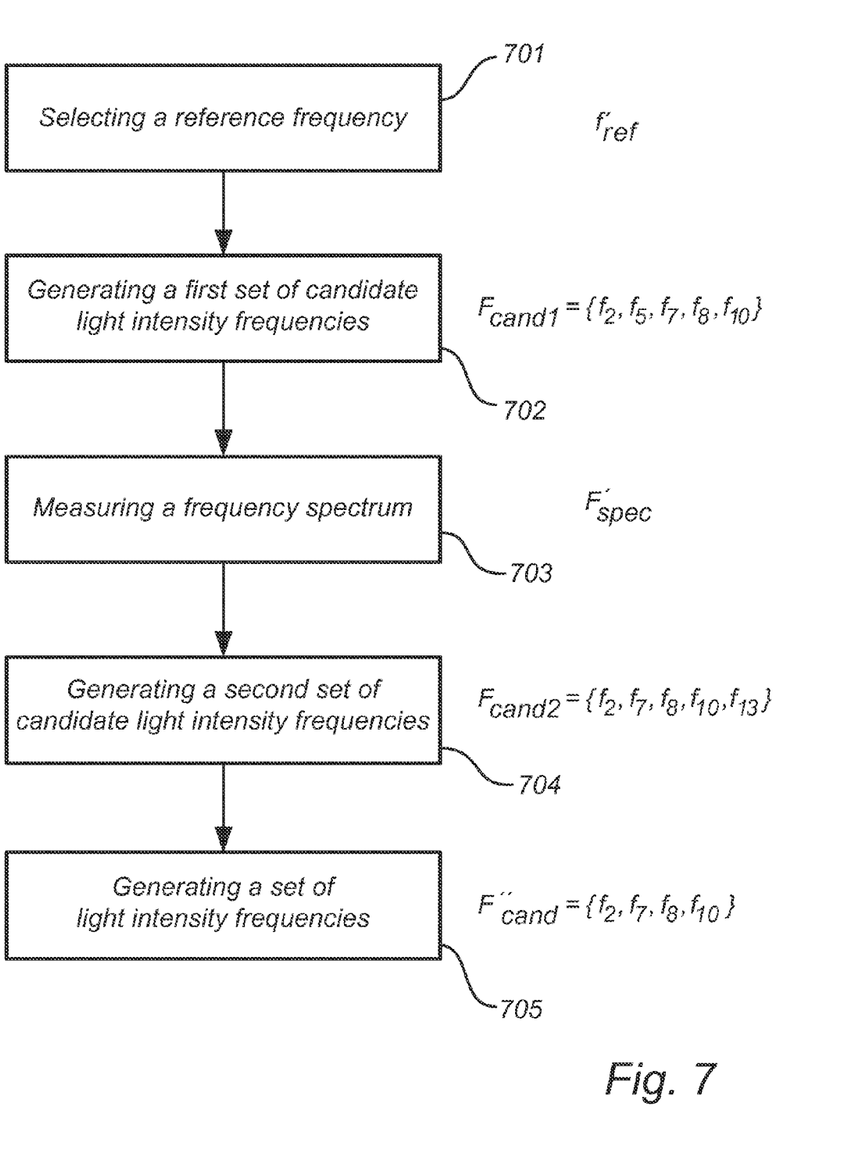

The first sequence $F_1$ and second sequence $F_2$ of light intensity frequencies could be selected by combining the previous embodiments for selecting the sequences. One such embodiment is illustrated in FIG. 7. A reference frequency $f_{ref}$ is selected, as denoted by 701. A first set of candidate light intensity frequencies $F_{cand1}$ is generated, as denoted by 702. This is performed according to a previously disclosed manner, i.e. by dividing the reference frequency $f_{ref}$ by a plurality of mutually different divisors. Further, a frequency spectrum $F'_{spec}$ is measured, as denoted by 703. A second set of candidate light intensity frequencies $F_{cand2}$ is generated, as denoted by 704. This is performed according to a previously disclosed manner, i.e. by selecting light intensity frequencies which are unequal to frequencies, or unequal to multiples of frequencies, of the light intensity spectrum $F'_{spec}$. The selected light intensity frequencies form the second set of candidate light intensity frequencies $F_{cand2}$.

Finally, a set of candidate light intensity frequency $F''_{cand}$ is generated by selecting the light intensity frequencies which form the intersection between the first set of candidate light intensity frequencies $F_{cand1}$ and the second set of candidate light intensity frequencies $F_{cand2}$, i.e. the light intensity frequencies which are present in both the first set and second set of candidate light intensity frequencies.

From the set of light intensity candidate frequencies $F''_{cand}$, the first sequence $F_1$ and second sequence $F_2$ of light intensity frequencies are selected.

The generating 702 of the first set of candidate light intensity frequencies and the generating 704 of the second set of candidate light intensity frequencies may be performed in another order than indicated by FIG. 7. They could also be performed parallel with each other or in the reverse order.

The embodiments above discloses two symbols for embedding data in the VLC. It is realized that the approaches is equally applicable on VLC techniques utilizing more than two symbols, which is achieved by a straightforward extension of the embodiments disclosed above wherein each symbol is represented by a unique sequence of light intensity frequencies. Hence, the scope of the present application is not limited to VLC techniques utilizing only two symbols.

The light transmitter device 1 can be a part of a VLC system, which further comprises a receiver, which has been described in some of the above disclosed embodiments.

There are different approaches to how the receiver may extract data of a transmitted signal. As a first example, the frequency hopping signal may have a fixed allocation, i.e. the first and second sequences are fixedly determined for representing symbols for embedding data. For such fixed hopping frequency allocation, the receiver can be preconfigured for those hopping frequencies before undertaking the communications. As a second example, the frequency hopping signal may be flexible, i.e. the first and/or second sequences composing the light signal may be reselected between different transmissions. In such flexible hopping frequency allocation, the communication can be based on a predefined signaling approach. For instance, every data packet may contain a packet header. The packet header is modulated by a fixed way of modulation, such as Binary Phase Shift Keying (BPSK), which is known to the receiver. Thereby, the packet header contains information about how the rest of the packet is being modulated, i.e. which intensity frequencies are selected.

The light transmitter device 1 may be a part of a light transceiver device, which further comprises a receiver arranged to receive a light signal from another light transmitter device. The light emitter and receiver may be the same component. Two light transceiver devices may be arranged for VLC between them. The light transceiver devices may form a stand-alone network, or be a part of a greater network.

In summary, a method and device for visible light communication is disclosed. The method comprises selecting a first sequence and a second sequence of light intensity frequencies to represent a first symbol and a second symbol, respectively, for embedding data. The method comprises further transmitting a light signal. The light signal comprises time periods in which a light intensity of the light signal is sequentially controlled according to the selected sequence of light intensity frequencies. Thereby, a frequency hopping light signal is generated, in which data may be embedded. The light signal may be generated and transmitted by the device comprising a light emitter.

The person skilled in the art realizes that the present invention by no means is limited to the preferred embodiments described above. On the contrary, many modifications and variations are possible within the scope of the appended claims. For example, a sequence of light intensity frequencies could be selected from a predetermined set of candidate light intensity frequencies which e.g. is determined by a standard VLC protocol. Another example of variation is to transmit data utilizing more than two symbols for embedding data, which is also feasible within the scope of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for visible light communication, the method comprising:
   measuring a frequency spectrum ($F_{spec}$) comprising light intensity frequencies in surrounding light;
   generating a set of candidate light intensity frequencies by selecting light intensity frequencies which are unequal to frequencies, or unequal to multiples of frequencies, of the frequency spectrum, wherein each selected frequency defines a candidate light intensity frequency;
   selecting from the set of candidate light intensity frequencies a first sequence of light intensity frequencies to represent a first symbol for embedding data, and selecting from the set of candidate light intensity frequencies a second sequence, different from the first, of light intensity frequencies, to represent a second symbol for embedding data; and
   transmitting a light signal comprising a first time period in which a light intensity of the light signal is sequentially controlled according to the first sequence of frequencies, and comprising a second time period in which the light intensity of the light signal is sequentially controlled according to the second sequence of frequencies, thereby generating a frequency hopping light signal,
   wherein the light intensity is controlled by modulating the light intensity between a first intensity and a second intensity.

2. The method according to claim 1, wherein the second sequence of frequencies comprises the same frequencies as the first sequence of frequencies, and wherein the second sequence of frequencies is arranged in a different order than the first sequence of frequencies.

3. The method according to claim 2, wherein the second sequence of frequencies is arranged in a reverse order relative to the first sequence of frequencies.

4. The method according to claim 1, wherein the lower of the first intensity and the second intensity is zero.

5. The method according to claim 1, wherein the light signal is equal to a pulse-width modulation signal which is utilized for controlling power to a light transmitter device for transmitting the light signal.

6. The method according to claim 1, wherein the set of candidate light intensity frequencies generated by selecting light intensity frequencies which are unequal to frequencies, or unequal to multiples of frequencies, of the frequency spectrum is a second set of candidate light intensity frequencies ($F_{cand2}$),
wherein the method further comprises:
selecting a reference frequency;
generating a first set of candidate light intensity frequencies by dividing the reference frequency by a plurality of mutually different divisors, wherein each quotient defines a candidate light intensity frequency in the first set of candidate light intensity frequencies;
and
generating a set of candidate light intensity frequencies by selecting the light intensity frequencies which form the intersection between the first set of candidate light intensity frequencies and the second set of candidate light intensity frequencies;
wherein the first and second sequences of light intensity frequencies are selected from the set of candidate light intensity frequencies.

7. The method according to claim 6, wherein the divisors are prime numbers.

8. The method according to claim 6, wherein the reference frequency is a clock frequency for a clock in a light transmitter for transmitting the light signal.

9. The method according to claim 1, wherein the light intensity frequencies in at least one of the first sequence and the second sequence of light intensity frequencies are mutually prime.

10. The method according to claim 1, wherein the light intensity frequencies in the first and second sequences lie within the range of 100 Hz to 50 000 Hz.

11. A light transmitter device for visible light communication, the device comprising:
   a sensor for measuring a frequency spectrum comprising light intensity frequencies in surrounding light;
   a candidate light intensity frequency generator for generating a set of candidate light intensity frequencies by selecting light intensity frequencies which are unequal to frequencies, or unequal to multiples of frequencies, of the frequency spectrum, wherein each selected frequency defines a candidate light intensity frequency;
   a frequency sequence selector for selecting from the set of candidate light intensity frequencies a first sequence of light intensity frequencies to represent a first symbol for embedding data, and for selecting from the set of candidate light intensity frequencies a second sequence, different from the first, of light intensity frequencies, to represent a second symbol for embedding data; and
   a light emitter arranged for emitting a light signal comprising a first time period in which a light intensity of the light signal is sequentially controlled according to the first sequence of frequencies, and comprising a second time period in which the light intensity of the light signal is sequentially controlled according to the second sequence of frequencies, thereby generating a frequency hopping light signal,
   wherein the light intensity is controlled by modulating the light intensity between a first intensity and a second intensity.

12. The light transmitter device according to claim 11, wherein the light emitter is selected from a group of: light emitting diodes, incandescent lamps, fluorescent lamps, laser light sources, or a combination thereof.

* * * * *